April 22, 1924.
L. R. HUFF
1,490,976
REGULATOR FOR TURBOCOMPRESSORS
Filed July 24, 1923      2 Sheets-Sheet 1
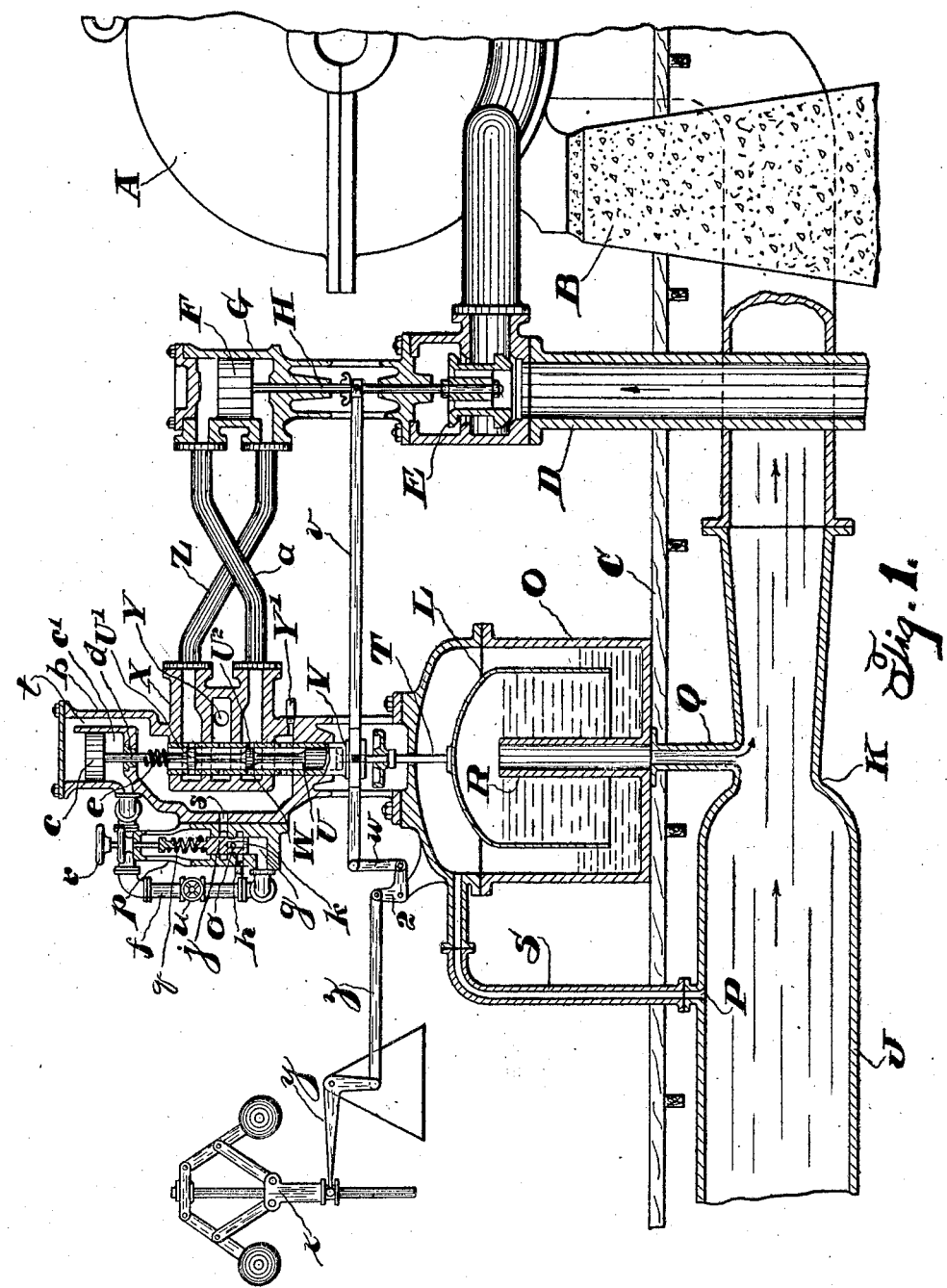
INVENTOR
Leslie R. Huff.
BY
Herbert K. Ogden
HIS ATTORNEY

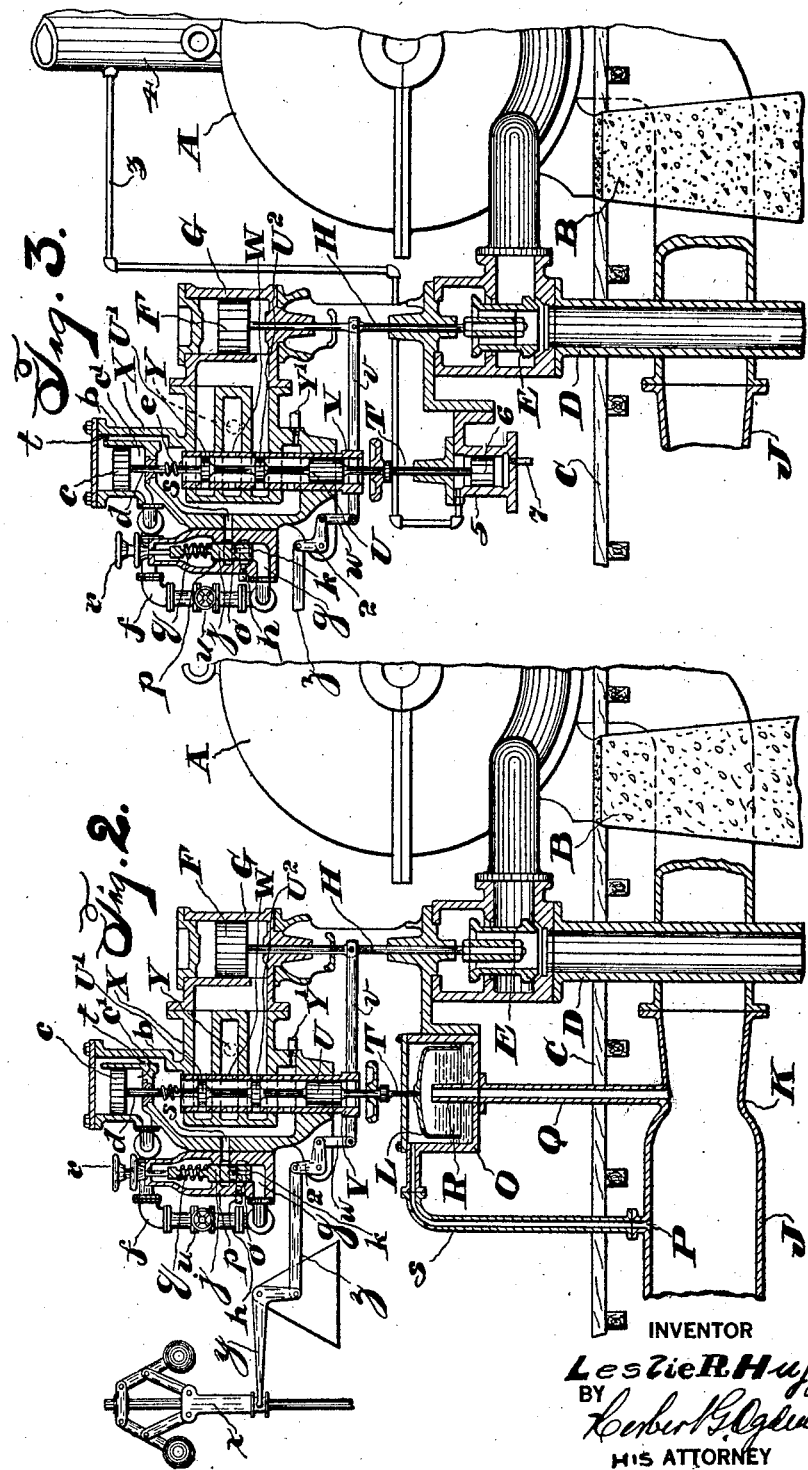

Patented Apr. 22, 1924.

1,490,976

UNITED STATES PATENT OFFICE.

LESLIE R. HUFF, OF PHILLIPSBURG, NEW JERSEY, ASSIGNOR TO INGERSOLL-RAND COMPANY, OF JERSEY CITY, NEW JERSEY, A CORPORATION OF NEW JERSEY.

REGULATOR FOR TURBOCOMPRESSORS.

Application filed July 24, 1923. Serial No. 653,442.

*To all whom it may concern:*

Be it known that I, LESLIE R. HUFF, a citizen of the United States, and a resident of Phillipsburg, county of Warren, and State of New Jersey, have invented a certain Regulator for Turbocompressors, of which the following is a specification, accompanied by drawings.

This invention relates to a volume or pressure regulator for a turbo compressor, turbo blower, or the like, by means of which the speed of the machine is so regulated that the volume of delivery is maintained substantially constant irrespective of the pressure required to overcome the resistance in the discharge line system, or else the pressure may be maintained constant under certain conditions. In the operation of Bessemer furnaces, pneumatic tools, manufacturing shops and the like, it is highly desirable to maintain substantially a constant discharge pressure and in order to do this, some form of regulator is necessary to overcome the burden imposed upon the discharge line, as well as to prevent over-speeding of the turbo machine in the event of no burden on the discharge line.

The objects of this invention are to stabilize and insure a steady and even operation of the regulator, avoid oscillation in the parts of the regulator, prevent over-speeding of the turbo machine and reduce the number of parts between the regulator and throttle valve mechanism of the motor of the compressor.

Further objects of the invention will hereinafter appear, and to all of these ends, the invention consists of the features of construction, arrangement of parts and combinations of elements, substantially as hereinafter fully described and claimed in this specification and shown in the accompanying drawings, in which, Figure 1 is a diagrammatic longitudinal sectional elevation of a portion of a turbo compressor, provided with a volume regulator constructed in accordance with one preferred form of the invention.

Figure 2 is a similar view to that shown in Figure 1, showing a modification of the invention, and Figure 3 is a view similar to Figure 1, showing a further modification of the invention.

Referring to the drawings, a turbo compressor A is shown partly broken away for convenience of illustration, and mounted on the foundation B. For illustrative purposes, the floor line C of a power house is indicated, and it is to be understood that the steam end of the turbo machine A is being viewed in the drawings. The discharge from the compressor (not shown except in Figure 3) may be led to a blast furnace, to which it is desired to furnish a constant flow of air against varying pressure, and for this purpose, a constant volume regulator is provided for the motor of the compressor.

Steam is supplied to the compressor motor through the inlet pipe D controlled by the suitable throttle valve E actuated by the piston F in the cylinder G and connected to the throttle valve E by means of the stem H.

The intake conduit J for the compressor, is shown conveniently arranged below the floor line C and for the purpose of this invention, is provided with a Venturi tube or restricted portion K, at which point the velocity of the incoming fluid is increased. Since this static pressure of the fluid at the throat of the restricted portion K of the Venturi tube is sub-atmospheric and less than that of the full diameter of the venturi, advantage is taken of this fact in the construction of a suitable volume regulator. Movable means preferably in the form of a bell shaped float L within the receptacle O is provided for controlling the steam delivered to the motor and this float is preferably actuated by the difference in pressure existing between the restricted portion K of the intake conduit R, at which point the velocity of the fluid is increased, and a source of higher pressure, which may be atmospheric pressure in the full diametered portion of the intake conduit at the point P. As shown, the restricted portion K of the venturi is connected by the pipe Q and tube R to the inside of the bell, while the outside of the bell is connected by the piping S to the point P in the full diametered portion of the intake conduit, although the space outside of the bell L might be open to atmosphere under some circumstances, if desired. Fluctuation of pressure differences on the two sides of the bell L cause the float to move up and down, to vary the amount of motive fluid supplied to the motor of the compressor.

As shown, the float is connected by a stem

T to a pilot valve U, which is in this instance in the form of a spool valve having a plurality of heads U' and U², although this valve may be of any suitable form. A sleeve or bushing V is formed with a series of ports W cooperating with the valve heads U' and U² and is adapted to be moved in the valve casing X. Pressure fluid, such as oil, is pumped into the casing X through the port Y from any suitable source, and movement of the pilot valve U within the sleeve V controls the passage of such fluid from the casing through the pipes Z and a to the opposite sides of the piston F. A drain pipe Y' is connected to the casing X for draining the oil from the casing and may be connected to a pump, if desired, for using the oil over again.

In the operation of the device so far described, let it be assumed that the compressor is connected to supply a blast furnace with a constant volume of air. In such case the resistance in the furnace to the passage of air varies, and if the resistance increases, the speed of the compressor must be increased, in order to supply the same quantity of air passing through the compressor. If the resistance decreases, the speed must be reduced to maintain a constant quantity of air, and prevent too much air from passing. Upon an increase of the resistance in the discharge of the compressor, the velocity head in the intake is lowered, which results in an increase of pressure in the bell L, which forces the bell upwardly, moving the pilot valve U and the valve heads U' and U² upwardly, thus admitting oil under pressure under the valve head U' through the passage Z beneath the inlet valve piston F, which moves upwardly and opens the steam inlet throttle valve E to a further extent, increasing the speed of the motor. Oil above the piston F may flow back into the casing X through the pipe a and beneath the valve head U². Upon a decrease of resistance in the discharge of the compressor, the velocity head of the intake J is increased with a resultant decrease of pressure in the bell. The bell L is sucked or pulled downwardly and the pilot valve U and heads U' and U² are forced downwardly, admitting pressure past the head U² through the pipe a, above the inlet valve piston F, forcing the throttle valve E downwardly, thus tending to close the throttle valve to a greater extent, which decreases the speed of the motor. This regulation and control effected by the volume regulator continues automatically.

In order to compensate for the thrust of the bell L, a fluid pressure thrust compensating cylinder b formed on the casing X, is provided with the balancing piston c having a stem or rod d which is in this instance connected to the upper end of the stem of the pilot valve U by a coil spring e, in order that there may be slight lost motion between the pilot valve and the balancing piston c. Piping f affords communication between the space g in the cylinder p and the space c' beneath the balancing piston c. A compensating piston j, provided with a slot k and port o, is adapted to be moved in the cylinder p. A coil spring q maintains the compensating piston j in its neutral position and a hand wheel r is provided for manually adjusting the tension on the coil spring. As the balancing piston c is moved downwardly, due to the action of the bell float L, the oil pressure in the chamber c' under the piston is increased so that the pressure in the chamber c' is greater than the pressure in the space or chamber g, and the compensating piston j will be moved upwardly permitting oil to flow from the chamber g through the slot k and port o in the piston j, into the casing X through the passage s. On the other hand should the balancing piston c be moved upwardly by the bell float L, the oil above the piston c will over-flow into the casing X through the passage t and the pressure in the chamber c' will be reduced and the pressure in the chamber g will be greater, so that the oil from the chamber g will flow through the piping f into the chamber c', permitting the coil spring q to move the compensating piston j downwardly and permit oil to be pumped into the chamber g through the pipe h, port o and slot k. By this means, the pressures in the chambers c' and g tend to equalize. A valve u in the piping f is provided to increase or retard the dash pot action. To obtain adjustments for different volumes of air passing through the compressor, the hand wheel r for the compensator spring q may be adjusted to vary the compression of the spring.

A lever v is pivotally connected to the steam admission valve rod H at one end and is also connected intermediate its length to the pilot valve sleeve V. The opposite end of the lever v is fulcrumed to the link w of the governor mechanism, and any vertical movement of the valve rod H transmits a corresponding movement to the ported sleeve V, which compensates for the movement of the pilot valve U by stopping the flow of oil to the casing G thereby tending to maintain the throttle valve piston F in its neutral position. For every movement of the pilot valve U a corresponding but compensating movement will be transmitted to the sleeve V.

To prevent the regulator from causing over-speeding of the machine, suitable automatic means are provided in this instance shown in the form of a ball or spring governor x, which is operatively connected to the steam admission valve E through the bell crank y, link z, bell crank 2, link w and lever v. The governor x is adapted to be mounted on the machine, but is merely shown diagrammatically in the drawings. When the maximum speed of the motor is reached, the sleeve V of the pilot valve U is moved upwardly by the connections described, but as the bell float L will be moved downwardly, due to the increased suction through the venturi, carrying the pilot valve U downwardly, oil will be admitted above the piston F tending to move the inlet or admission valve E towards closed position, and bring the speed back to operating speed. Oil has been mentioned as the fluid used for the operation of the regulator, because oil is generally used, but other fluid may be provided by means of which the same results are accomplished.

In the modification shown in Figure 2, the cylinder G and the casing X are constructed as a unit and brought close together to form a more compact regulator and eliminate pipes Z and a. The operation of the regulator shown in this figure is similar to that shown and described above. The pilot valve U is moved by the bell float L to admit oil beneath the piston F and any movement of the piston F transmits a corresponding movement to the sleeve V through the lever v, tending to compensate for the movement of the pilot valve.

In the modification shown in Figure 3, for pressure regulation, the bell float L is dispensed with and a pipe 3 connects the discharge line 4 of the compressor with the cylinder 5, having a piston 6 connected to the pilot valve U by the rod T. The face of the piston 6 opposite to that to which pressure is admitted through pipe 3 is open to atmosphere through the vent 7. The operation of this regulator is substantially similar to that described in connection with Figure 2, except that this regulator is controlled by variations of discharge pressure and not by variations in the intake conditions. Furthermore, while the balancing piston c has the same compensating functions as the other figures, it also acts to move the piston 6 and pilot valve U upwardly upon a decrease in the discharge pressure of the compressor. In such case the pressure in the chambers c' and g tend to equalize heretofore as described and compensating piston j moves downwardly under the action of the spring q permitting oil to be pumped through the piping f beneath the balancing piston c, which forces said piston upwardly. The remainder of the operation of the device is as before described.

I claim:

1. A regulator for a motor driven turbo compressor comprising movable means for controlling the motive fluid delivered to the motor and actuated by fluctuations in the difference in opposed pressures exerted on two pressure faces of said movable means, a pilot valve connected to said movable means, a relatively movable ported sleeve in which the pilot valve moves, and operative connections whereby movement of the pilot valve causes a compensating movement of the pilot valve sleeve.

2. A regulator for a motor driven turbo compressor comprising movable means for controlling the motive fluid delivered to the motor and actuated by fluctuations in the difference in opposed pressures exerted on two pressure faces of said movable means, a pilot valve connected to said movable means, a relatively movable ported sleeve in which the pilot valve moves, operative connections whereby movement of the pilot valve causes a compensating movement of the pilot valve sleeve, and a fluid actuated thrust compensating device associated with the pilot valve for compensating for the thrust of the said movable regulating means.

3. A regulator for a motor driven turbo compressor comprising movable means for controlling the motive fluid delivered to the motor and actuated by fluctuations in the difference in opposed pressures exerted on two pressure faces of said movable means, a pilot valve connected to said movable means, a relatively movable ported sleeve in which the pilot valve moves, operative connections whereby movement of the pilot valve causes a compensating movement of the pilot valve sleeve, a fluid actuated thrust compensating device, associated with the pilot valve for compensating for the thrust of the said movable regulating means, said compensating device including a balancing piston for retarding the movement of the movable means.

4. A regulator for a motor driven turbo compressor comprising movable means for controlling the motive fluid delivered to the motor and actuated by fluctuations in the difference in opposed pressures exerted on two pressure faces of said movable means, a pilot valve connected to said movable means, a relatively movable ported sleeve in which the pilot valve moves, operative connections whereby movement of the pilot valve causes a compensating movement of the pilot valve sleeve, a fluid actuated thrust compensating device, associated with the pilot valve for compensating for the thrust of the said movable regulating means, said compensating device including a balancing piston for retarding the movement of the movable means, and a compensating piston controlling the flow of pressure fluid to and from the balancing piston.

5. A constant volume regulator for a motor driven turbo compressor, comprising an intake conduit for the compressor, a pilot valve, movable means operatively connected to the pilot valve and actuated by the difference in pressure between two points in the intake of the compressor, a movable ported pilot valve sleeve in which the pilot valve moves, and operative connections between said pilot valve and ported sleeve whereby movement of the pilot valve creates a corresponding but compensating movement of the sleeve for restoring the balance of the parts.

6. A constant volume regulator for a motor driven turbo compressor comprising an intake conduit for the compressor, a pilot valve, movable means operatively connected to the pilot valve and actuated by the difference in pressure between two points in the intake of the compressor, a movable ported pilot valve sleeve in which the pilot valve moves, fluid pressure thrust compensating device adapted to compensate for the thrust of the movable means, and operative connections between said pilot valve and ported sleeve whereby movement of the pilot valve creates a corresponding but compensating movement of the sleeve for restoring the balance of the parts.

7. A constant volume regulator for a motor driven turbo compressor comprising an intake conduit for the compressor, a valve casing, a pilot valve in said casing, movable means actuated by the difference in pressure between two points in the intake of the compressor due to the velocity of the fluid passing through the intake, said pilot valve being operatively connected to said movable means, a ported pilot valve sleeve in which said valve moves, and a balancing piston for retarding the movement of the said removable means.

8. A constant volume regulator for a motor driven turbo compressor comprising a valve casing, a movable ported sleeve in said casing, a pilot valve in said sleeve adapted to control the flow of fluid from said casing, movable means actuated by the fluctuations in the difference in pressure exerted on two opposed pressure faces of the said movable means, said movable means being adapted to actuate the pilot valve, a fluid actuated valve controlled by said pilot valve for regulating the supply of fluid to the motor and a connection between the fluid actuated valve and the ported sleeve, whereby movement of the pilot valve causes a compensating movement of the sleeve.

9. A constant volume regulator for a motor driven turbo compressor, comprising a valve casing, a movable ported sleeve in said casing, a pilot valve adapted to be moved in the sleeve, movable means actuated by the difference in pressure between two points in the intake of the compressor due to the velocity of the fluid passing through the intake, operative connections between said pilot valve and ported sleeve whereby movement of the pilot valve in one direction creates a corresponding but compensating movement of the sleeve, and a maximum speed governor connected to said sleeve.

10. A constant volume regulator for a motor driven turbo compressor, comprising a valve casing, a movable ported sleeve in said casing, a pilot valve adapted to be moved in the sleeve, movable means actuated by the difference in pressure between two points in the intake of the compressor due to the velocity of the fluid passing through the intake, operative connections between said pilot valve and ported sleeve whereby movement of the pilot valve in one direction creates a corresponding but compensating movement of the sleeve, a maximum speed governor connected to said sleeve, and an adjustable fluid pressure thrust compensating device, adapted to be adjusted to control the volume of fluid supplied to the compressor.

11. A constant volume regulator for a motor driven turbo compressor comprising a valve casing, a fluid pressure thrust compensating device, said casing and compensating device being in the form of a unit, a movable ported sleeve in the casing, a pilot valve movable in said sleeve, a balancing piston connected to retard the movement of the pilot valve, means for supplying fluid pressure to said casing, movable means actuated by the difference in pressure between two points in the intake of the compressor due to the velocity of the fluid passing through the intake, said movable means being directly connected to the pilot valve, a fluid actuated valve controlling the supply of fluid to the motor, and connections between the supply of the fluid actuated valve and the casing, whereby movement of the pilot valve controls the admission of fluid to the said fluid actuated valve, and a connection between the fluid actuated valve and the sleeve, whereby movement of the pilot valve in one direction causes a corresponding but compensating movement of the sleeve, and a maximum speed governor connected to the sleeve.

In testimony whereof I have signed this specification.

LESLIE R. HUFF.